United States Patent [19]
Heck

[11] 3,729,292
[45] Apr. 24, 1973

[54] ANTI-FRICTION BEARING PAD

[75] Inventor: Friedrich Heck, Deilinghofen, Germany

[73] Assignees: Duria-Werk Karl Kempf KG, Neuss, Germany; Atkiengesellschaft Adolph Saurer, Arbon, Switzerland

[22] Filed: July 2, 1970

[21] Appl. No.: 51,914

[52] U.S. Cl. ............... 29/182.3, 29/182.5, 75/200, 75/201, 75/208 R, 252/12.2
[51] Int. Cl. .............................................. C10m 7/00
[58] Field of Search ...................... 117/71 M, 22; 29/182.3, 182.5; 75/208 R, 200, 201; 252/12.2

[56] References Cited

UNITED STATES PATENTS

| | | |
|---|---|---|
| 2,995,462 | 8/1961 | Mitchell et al .................... 117/71 X |
| 3,416,941 | 12/1968 | Mizuno ............................ 117/71 X |
| 3,431,136 | 3/1969 | Stilmar ............................ 117/71 X |
| 2,768,099 | 10/1956 | Hoyer ............................. 117/71 X |
| 3,140,195 | 7/1964 | Nagel ............................. 117/71 X |

*Primary Examiner*—Carl D. Quarforth
*Assistant Examiner*—B. Hunt
*Attorney*—McGlew and Toren

[57] ABSTRACT

An anti-friction bearing pad which is intended for use, for example, between the leaves of a leaf spring comprises a metal backing disc with a porous layer of sintered bronze or other metal applied to one surface. The porous sintered layer has, at least in its surface part a high proportion of a metal or metals which are more electro-positive than iron and the porous sintered layer is also impregnated with polytetrafluorethylene. The polytetrafluorethylene provides the necessary anti-friction properties and the content of metal which is more electro-positive than iron and which is in metal-to-metal contact with the metal of the porous sintered layer acts as a sacrificial anode in preventing corrosion of the spring leaves or other iron-containing parts with which the surface of the pad is, in use, in contact.

22 Claims, 5 Drawing Figures

Patented April 24, 1973  3,729,292

INVENTOR
FRIEDRICH HECK
BY McGlew & Toren
ATTORNEYS

Patented April 24, 1973 3,729,292

INVENTOR
FRIEDRICH HECK
BY McGlew & Toren
ATTORNEYS

ANTI-FRICTION BEARING PAD

Leaf springs in the suspensions of motor vehicles have the disadvantage that, if they are not given regular maintenance, the friction between the relatively moving leaves increases with the passage of time, and consequently the springs become less responsive. The effect in practice is that, due to the increased internal friction in the leaf spring, the spring is no longer able to respond to small imperfections in the road surface. For this reason coil springs or torsion springs are often preferred where good springing is important.

In order to reduce the internal friction, low maintenance leaf springs have been developed which have plastics discs interposed between the leaves. The plastics discs are made for example of polyamide resins and to reduce friction still further solid lubricants, for example molybdenum sulphide, can be mixed with the polyamide resins. However no completely satisfactory improvements have been obtained in this way, because the coefficient of friction of a plastics disc of this kind increases progressively until ultimately the disc is destroyed. The reason for this is that surface rust forms on the frictional surfaces of the leaves of the spring, even if the moisture in the atmosphere is below the saturation point, and the rust acts as an abrasive. Addition of lubricating grease to the discs does not prevent them from being destroyed. Suspension springs of the multileaf type with interposed polyamide discs containing molybdenum sulphide and lubricating grease provide good springing effects only for a working life corresponding to at the most 25,000 km travelled by the vehicle.

Self-lubricating bearings are known which consist of a porous metal matrix containing polar organic compounds or hardenable synthetic resins. Another known anti-friction bearing has on at least one side a porous metal layer the pores of which are impregnated with polytetrafluorethylene to reduce friction.

The object of the present invention is to provide an anti-friction bearing pad which does not have the above disadvantages and which is suitable for use as an anti-friction disc interposed between the leaves of multi-leaf springs for motor vehicles, particularly for heavy commercial vehicles. To this end, according to this invention, an anti-friction bearing pad has a porous metal layer comprising a matrix impregnated with polytetrafluorethylene, at least the surface part of the layer also containing a high proportion of a metal or metals more electro-positive than iron. The expression "more electro-positive than iron" indicates that the electrode potential of the respective metal is higher than that of iron in the Electromotive Force Series of Elements.

The presence of the metal or metals more electro-positive than iron provides an effective protection against corrosion, whether or not the porous matrix is impregnated with polytetra fluoroethylene.

The surface part of the porous metal layer may be impregnated with metals which are highly electro-positive, for example, zinc, magnesium and/or aluminum, in such a way that the metals are in electrically conductive contact with the matrix of the layer. When the spring is in operation the electro-positive metals are brought into direct contact with the steel of the leaf spring, which is assumed to be a kind of steel which is subject to corrosion, the electro-positive metal protecting the steel of the spring against corrosion. The protective electro-positive metal is present not only on the bearing surface of the anti-friction pad but also to a certain depth in the interior of the pad, and consequently continues to protect the leaf spring from corrosion even after the anti-friction bearing pad has become worn down to a considerable extent. Provided that the electro-positive metal is introduced into the matrix of the metal of the pad in such a way that a good metal-to-metal contact is obtained, the electro-positive metal acts as a sacrificial anode in the corrosion process, effectively protecting the steel of the spring from corrosion.

If desired the anti-friction pad can be given an additional outer coating of electro-positive metal of from 30 to 40 $\mu$ thick, provided that a part of the electro-positive metal penetrates into the surface of the pad, so that the necessary anti-corrosion protection is still maintained even after the outer coating electro-positive metal has worn away. The metal matrix itself can if desired consist of porous sintered bronze, or porous sintered iron, or alternatively if desired the matrix may be made of woven metal wire.

In order to improve the anti-friction properties of the pad, the metal matrix can also contain a solid lubricant in the form of graphite, mica, molybdenum sulphide, tin and/or lead.

The working face of the pad preferably contains recesses, leaving only the surfaces between the recesses to act as bearing surfaces. The effect obtained is that material abraded from the bearing surfaces accumulates in the recesses, together with dirt, leaving the bearing surfaces clean and so ensuring that there is always a good metal-to-metal contact between the electro-positive metal and the spring steel surface. Particularly good results have been obtained by making the recesses in the form of straight grooves crossing each other at right angles and giving the pad the appearance of a grid.

The anti-friction bearing pad consists preferably of a steel support disc supporting a layer of sintered metal. If desired the under surface of the steel support disc can also have a coating of a metal which is more electro-positive than iron. For certain applications it is advisable to provide the steel support disc with a layer of porous metal on both sides. From experiments it has been found that the porosity of the layer or layers is preferably approximately 25 percent.

The pad may then be made by a method, in accordance with the invention, in which a powder mixture including bronze, graphite, molybdenum sulphide, zinc and lead is sprinkled onto the steel support plate, is sintered, the metal or metals more electro-positive than iron are incorporated in the sintered layer and finally the sintered layer is impregnated with polytetrafluorethylene.

A copper bronze containing the following parts by weight: copper 84, tin 8, lead 8, graphite 4 and molybdenum sulphide 5 has been found suitable for the layer. In the course of an experiment an anti-friction bearing pad was made with a porous matrix having the composition mentioned just above. Zinc was incorporated in the matrix, leaving a surface coating of zinc 30 to 40 $\mu$ thick. After impregnation with polytetrafluorethylene the anti-friction pad had a coefficient of friction with a smooth steel spring of 0.06, and this remained unchanged after a wear test involving two million spring movements, corresponding to a distance of 65,000 km travelled by a heavy commercial vehicle.

Anti-friction bearing pads in accordance with the invention may be made by the following process. On to a steel support plate for example a bronze powder containing graphite, molybdenum sulphide, tin and/or lead is sprinkled. The steel support plate with its layer of powder is then sintered and if necessary the sintered layer may be compressed. Electro-positive metal is then incorporated into the sintered layer. During the sintering process the loosely sprinkled powder on the steel support plate is converted into a porous but nevertheless strongly adhering metal matrix. The recesses or grooves can then if desired be pressed into the surface of the sintered layer. Alternatively if desired the grooves can be produced by sprinkling the powder onto the steel support plate through wire mesh. When the wire mesh is removed the grooves remain in the surface of the sprinkled powder. In the case of a sintered layer which, in the finished anti-friction pad has a thickness of approximately 1 mm, a 5 mm wire mesh is preferably used. After sintering the layer under a protective gas, if the porosity is too great it can be reduced by a subsequent press operation to the desired porosity of for example 25 percent.

Alternatively the electro-positive protective metal can be incorporated in the metal matrix by diffusion. This is done as follows. The anti-friction bearing pad is immersed in zinc powder containing some powdered carbon, air being excluded to prevent oxidation. The whole is then rolled at 300° to 500°C, the electro-positive protective metal penetrating into the pores of the sintered layer. During this process there also forms on the surface of the sintered layer, and on the non-porous surface of the steel support plate, a surface coating of the protective metal. This surface coating is firmly bonded to the metal matrix by the diffusion process. There is obtained an effective corrosion protection for the steel support plate.

Alternatively if desired the electro-positive metal can be incorporated in the metal matrix galvanically. As a still further alternative the electro-positive metal can be incorporated into the metal matrix by a tumbling procedure. The anti-friction pad is tumbled in a tumbling barrel containing the electro-positive metal in the form of a powder. This method also has the effect of incorporating the non-noble protective metal in the metal matrix, leaving a surface coating on the surface of the disc.

After the electro-positive metal has been incorporated with the metal matrix, and also applied to form a firmly bonded outer coating on the surface of the pad, using one or other of the methods mentioned above, the anti-friction pad is impregnated with a polytetrafluorethylene suspension. After evaporating the solvent, a thin layer of polytetrafluorethylene remains on the surface of the pad. This surface layer is however rapidly forced into the metal matrix as soon as a multi-leaf spring with which the pad is used is stressed in operation. Consequently electrically conductive metal-to-metal contact between the metal matrix and the electro-positive metal on the one hand and the working surface of the steel leaf spring is rapidly obtained.

After the impregnation with polytetrafluorethylene the sintered layer can if desired be compressed somewhat, to give it a smooth surface and to force the polytetrafluorethylene partly or entirely from the surface of the pad into the metal matrix.

An example of an anti-friction pad and of a method of making it in accordance with the invention will now be described with reference to the accompanying drawings, in which.

Figure 1:
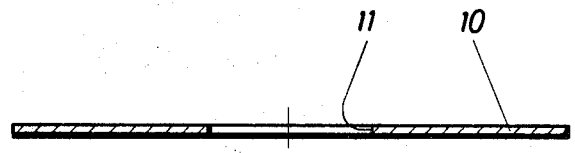
FIG. 1 is a section through a steel support disc of the pad.
Figure 2:
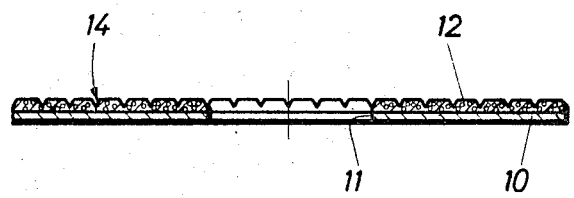
FIG. 2 is a similar view of the disc with a sintered layer grooved o have a grid-like appearance.
Figure 3:
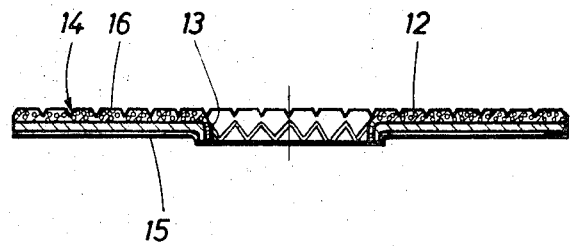
FIG. 3 is a view similar to FIG. 2 but with the addition of a locking flange made by a drawing operation; the pad now containing incorporated electro-positive metal.
Figure 4:
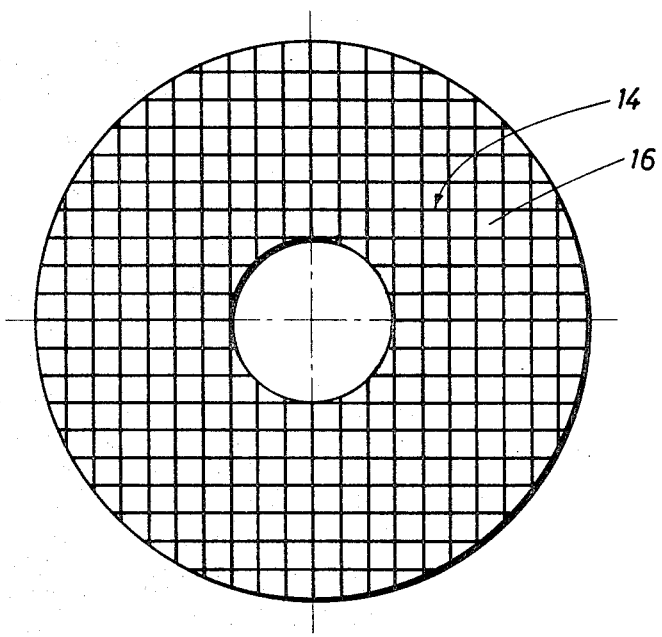
FIG. 4 is a plan view of the pad shown in FIG. 3.

A steel disc 10 as shown in FIG. 1 has a thickness of approximately 0.7 mm, a diameter of approximately 100 mm, and has a central hole 11. On to the disc 10 there is sprinkled, for example through wire mesh, a powder which will form the anti-friction layer. If the powder is sprinkled through wire mesh there remain, after the mesh has been removed, grooves 14 in the surface of the powder layer as shown in FIG. 2. The disc 10, with its layer of powder, is then sintered under a protective gas. This forms, on the surface of the steel support plate 10, a firmly adhering porous anti-friction layer 12. Into the sintered layer 12 there is then incorporated an electro-positive metal, for example zinc, by diffusion, tumbling or a galvanic method. Finally the whole assembly is impregnated with polytetrafluorethylene. In this example the anti-friction pad is provided with a locking flange 13 (FIG. 3). by a drawing operation, for locking the pad in position on a supporting spring leaf.

Figure 5:
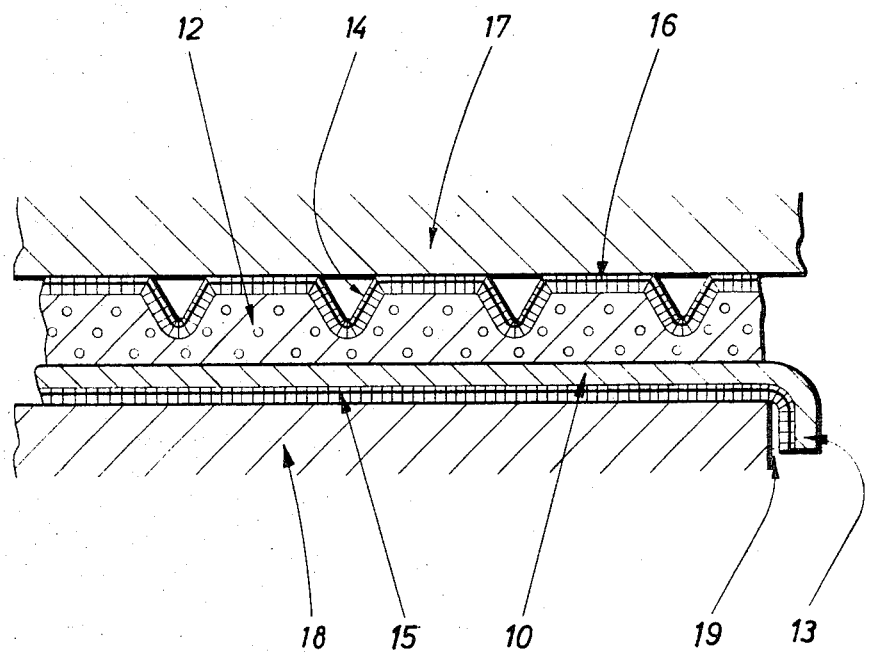
FIG. 5 is a section drawn to a larger scale, showing a part of the pad between two leaves of a spring.

As shown in FIG. 5, when the anti-friction bearing pad is in use it rests between two leaves 17 and 18 of a spring, the locking flange 13 engaging in a hole 19 in the lower leaf 18. The fact that the pad is locked in position on the supporting leaf 18 ensures that sliding movement takes place essentially only between the working surface 16 of the sintered layer 12, and the under surface of the upper spring leaf 17. The surface part 16 of the sintered layer contains the electro-positive metal, and if desired the electro-positive metal can also form a surface coating on the working surface of the pad. The electro-positive metal is in electrically conductive contact both with the sintered layer 12 and with the spring leaf 17. The electro-positive metal extends not only over the working surfaces of the pad, which rest in contact with the lower surface of the spring leaf 17, but also into the grooves or recesses 14. Consequently the leaf spring is always effectively protected against corrosion, even after the surface part 16 containing the electro-positive metal has become worn away at the working surfaces. Under these circumstances there still remains enough electro-positive metal in the surface parts of the recesses to ensure adequate electric contact with the lower surface of the spring leaf 17. The upper surface of the lower spring leaf 18, and the lower surface of the steel support disc 10, are also protected against corrosion by a diffused or galvanically applied layer 15 of electro-positive metal on the under surface of the steel support disc 10.

I claim:

1. In an anti-friction bearing pad including at least one porous metal surface layer impregnated with polytetrafluorethylene, the improvement comprising that said metal surface layer additionally contains at least one metal which is more electro-positive than iron, said metal being locked in the pores of said porous metal surface layer in metal-to-metal contact with the metal of the surface layer and being present in said layer in an amount sufficient to prevent corrosion and thus to prolong the anti-friction characteristics of the pad.

2. A pad as claimed in claim 1, wherein said metal which is more electro-positive than iron is selected from the group consisting of zinc, magnesium and aluminium, said electro-positive metal being in metal-to-metal contact with said porous metal layer.

3. A pad as claimed in claim 1, further comprising a coating of said metal which is more electro-positive than iron on the surface of said porous layer, said coating having a thickness of from about 30 to about 40 $\mu$.

4. A pad as claimed in claim 1, wherein the metal from which said porous layer is made is sintered bronze.

5. A pad as claimed in claim 1, wherein the metal from which said porous layer is made is sintered iron.

6. A pad as claimed in claim 1, wherein said porous layer is made from woven metal wire.

7. A pad as claimed in claim 1, further comprising at least one material selected from the group consisting of graphite, mica, molybdenum sulphide, tin and lead in said porous layer.

8. A pad as claimed in claim 1, wherein recesses are provided in the surface of said porous layer.

9. A pad as claimed in claim 8, wherein said recesses define up to about 50 percent of the total area of the surface of said porous layer.

10. A pad as claimed in claim 8, wherein said recesses are in the form of a series of grooves, grooves in said series extending at right angles to each other to form a grid.

11. A pad as claimed in claim 1, further comprising a steel support plate to which said porous metal layer is bonded.

12. A pad as claimed in claim 11, further comprising a coating of said one metal which is more electro-positive than iron.

13. A pad as claimed in claim 1, wherein the porosity of said porous metal layer is about 25 percent.

14. A pad as claimed in claim 11, wherein said porous metal layer is a sintered metal having the following composition in parts by weight: copper 84, tin 8, lead 8, graphite 4 and molybdenum sulphide 5.

15. A process for making an anti-friction bearing pad including the steps of sprinkling a powder mixture onto a steel support plate to form a layer thereon, said powder mixture including bronze, graphite, molybdenum sulphide, tin and lead, sintering said powder mixture to produce a porous layer adhering to said steel support plate, incorporating at least one metal which is more electro-positive than iron in the pores of said porous layer and thereafter impregnating said porous layer with polytetrafluorethylene.

16. A process as claimed in claim 15, comprising the further step of compressing said sintered powder mixture before said electro-positive metal is incorporated in said porous layer formed thereby.

17. A process as claimed in claim 16, wherein recesses are formed in the surface of said porous layer during said compressing step.

18. A process as claimed in claim 15, wherein said step of incorporating said metal which is more electro-positive than iron is carried out by diffusing said at least one metal in said porous layer.

19. A process as claimed in claim 15, wherein said step of incorporating said metal which is more electro-positive than iron in said porous layer is carried out galvanically.

20. A process as claimed in claim 15, wherein said step of incorporating said metal which is more electro-positive than iron in said porous layer consists in tumbling said pad with said porous layer thereon in said at least one metal in powdered form.

21. A process as claimed in claim 15, wherein said porous layer is impregnated with said polytetrafluorethylene in the form of a suspension.

22. A process as claimed in claim 15, comprising the further step of compressing said porous layer after said impregnation with polytetrafluorethylene.

* * * * *